(12) United States Patent
Chan

(10) Patent No.: US 7,949,814 B2
(45) Date of Patent: May 24, 2011

(54) SWAPPING "FIXED SYSTEM" HARD DISK

(76) Inventor: Kam Fu Chan, Tsuen Wan (HK)

(*) Notice: Subject to any disclaimer, the term of this patent is extended or adjusted under 35 U.S.C. 154(b) by 579 days.

(21) Appl. No.: 11/597,081

(22) PCT Filed: May 22, 2004

(86) PCT No.: PCT/IB2004/050757
§ 371 (c)(1),
(2), (4) Date: Nov. 17, 2006

(87) PCT Pub. No.: WO2005/114359
PCT Pub. Date: Dec. 1, 2005

(65) Prior Publication Data
US 2008/0215871 A1  Sep. 4, 2008

(51) Int. Cl.
G06F 13/00 (2006.01)
H05K 7/10 (2006.01)

(52) U.S. Cl. .................... 710/304; 710/302

(58) Field of Classification Search .......... 710/300–304
See application file for complete search history.

(56) References Cited

U.S. PATENT DOCUMENTS

| | | | | |
|---|---|---|---|---|
| 5,426,727 A * | 6/1995 | Sugiura et al. | | 345/467 |
| 5,548,740 A * | 8/1996 | Kiyohara | | 345/543 |
| 5,557,499 A * | 9/1996 | Reiter et al. | | 361/679.39 |
| 5,574,920 A * | 11/1996 | Parry | | 713/340 |
| 5,968,174 A * | 10/1999 | Hughes | | 713/2 |
| 6,032,223 A * | 2/2000 | Beelitz | | 711/104 |
| 6,279,109 B1 * | 8/2001 | Brundridge | | 713/2 |
| 6,295,565 B1 * | 9/2001 | Lee | | 710/301 |
| 6,591,376 B1 * | 7/2003 | VanRooven et al. | | 714/36 |
| 6,594,721 B1 * | 7/2003 | Sakarda et al. | | 710/304 |
| 6,668,305 B1 * | 12/2003 | Henriquez | | 711/112 |
| 6,678,712 B1 * | 1/2004 | McLaren et al. | | 718/100 |
| 6,735,671 B1 * | 5/2004 | Kida | | 711/111 |
| 6,738,851 B2 * | 5/2004 | Lin | | 710/302 |
| 6,760,869 B2 * | 7/2004 | Lam | | 714/42 |
| 6,801,973 B2 * | 10/2004 | Wu | | 710/301 |
| 6,804,774 B1 * | 10/2004 | Larvoire et al. | | 713/2 |
| 6,957,288 B2 * | 10/2005 | Metevier et al. | | 710/100 |
| 7,047,356 B2 * | 5/2006 | Chen | | 711/113 |
| 7,114,085 B1 * | 9/2006 | Kim | | 713/300 |
| 7,120,788 B2 * | 10/2006 | Ramirez | | 713/100 |
| 7,159,063 B2 * | 1/2007 | Sivertsen | | 710/306 |
| 7,384,276 B2 * | 6/2008 | Lee | | 439/79 |
| 7,395,394 B2 * | 7/2008 | Federa et al. | | 711/163 |
| 7,827,215 B2 * | 11/2010 | Chao et al. | | 707/827 |
| 2001/0036178 A1 * | 11/2001 | Savory | | 370/364 |
| 2002/0194394 A1 * | 12/2002 | Chan | | 709/319 |
| 2003/0033465 A1 * | 2/2003 | Chien et al. | | 710/302 |
| 2004/0019710 A1 * | 1/2004 | Kolli et al. | | 710/19 |
| 2004/0073783 A1 * | 4/2004 | Ritchie | | 713/1 |
| 2005/0152061 A1 * | 7/2005 | Hoelsaeter | | 360/92 |
| 2005/0262322 A1 * | 11/2005 | Ma | | 711/165 |
| 2006/0048143 A1 * | 3/2006 | Chao et al. | | 717/177 |
| 2009/0235102 A1 * | 9/2009 | Koshika et al. | | 713/324 |
| 2010/0223425 A1 * | 9/2010 | Meagher et al. | | 711/104 |

FOREIGN PATENT DOCUMENTS

| | | | | |
|---|---|---|---|---|
| JP | 2006031663 A | * | 2/2006 | |
| JP | 2008162054 A | * | 7/2008 | |
| JP | 2010092240 A | * | 4/2010 | |
| WO | WO 9724655 A1 | * | 7/1997 | |
| WO | WO 02054234 A1 | * | 7/2002 | |

OTHER PUBLICATIONS

Part No. 800-6219-10, "Desktop Storage Module Service Manual: Chapter 5", Aug. 1991, Sun Microsystems, Inc., Revision A, pp. 1-8, retrieved from the Internet on Jun. 1, 2009 at http://docs.sun.com/source/800-6219-10/chap5.html.*

Wang Jian; Li Bin; Liu Yanheng; , "Design and implementation of a trusted remote remediation framework for vehicle software," Control Conference (CCC), 2010 29th Chinese , pp. 4151-4156, Jul. 29-31, 2010.*

Markatos, E.P.; , "Using remote memory to avoid disk thrashing: a simulation study," Modeling, Analysis, and Simulation of Computer and Telecommunication Systems, 1996. MASCOTS '96., Proceedings of the Fourth International Workshop on , pp. 69-73, Feb. 1-3, 1996.*

Underwood, C.I.; Ward, J.W.; Dyer, C.S.; Sims, A.J.; , "Observations of single-event upsets in non-hardened high-density SRAMs in Sun-synchronous orbit," Nuclear Science, IEEE Transactions on , vol. 39, No. 6, pp. 1817-1827, Dec. 1992.*

Janson, B.; Kummerfeld, B.; , "Soda: a file system for a multicomputer," Cluster Computing, 1999. Proceedings. 1st IEEE Computer Society International Workshop on , pp. 131-136, 1999.*

* cited by examiner

Primary Examiner — Faisal M Zaman
(74) Attorney, Agent, or Firm — Buchanan Ingersoll & Rooney PC

(57) ABSTRACT

Method for 'Cool-Swap', 'Warm-Swap' and 'Hot-Swap' of 'Fixed' 'System' hard disk(s) in and out of the computer and for re-cycling the computer between 'diskly' state to 'diskless' state by combining the following features in one way or the other: separating the power supply of the 'Fixed' 'System' hard disk(s) from the internal power supply that is supplying power to other components of the computer, in particular the motherboard; taking the operating system, capable of being taken to run as ramdisk-based operating system, in control of the computer to run as ramdisk-based operating system; putting the computer into different power management states; and issuing commands or instructions for logical disconnection and/or re-connection of hard disk(s).

8 Claims, No Drawings

SWAPPING "FIXED SYSTEM" HARD DISK

TECHNICAL FIELD

This invention relates in general to swapping 'Fixed' 'System' hard disk(s) on running operating systems in computers (used hereafter as including computer-related or computer-controlled machines and devices); and in particular to the removal and insertion or disconnection and connection of Fixed' 'System' hard disk(s) for use in running diskless computers (used hereafter as including diskless computer-related or diskless computer-controlled machines and devices).

BACKGROUND ART

In any computers installed with 'Fixed' 'System' hard disk (s), such 'Fixed' 'System' hard disk(s) from which the computer is started to run is/are so far not to be swapped or taken away and re-inserted while the computer is under the control of the operating system, which is running in the computer and specifically running on the 'Fixed' 'System' hard disk(s). Hot-Swap-Enabling' device is especially designed with the capability for enabling 'Hot-Swap' (taken hereafter as meaning also 'Hot-Plug') for those 'Non-Hot-Swappable' hard disks attached to it. They are designed to have features meeting the following challenges for 'Hot-Swapping' as outlined in: http://www.maxtor.com/en/documentation/white_papers/sata_hot_plug_white_paper.pdf and quoted as follows: controlling electrostatic discharge during insertion of the HDD (Hard Disk Drive) into the system slot to avoid damaging the HDD; controlling in-rash current to the HDD from the host [i.e. the computer] to prevent voltage drops; ensuring the host is able to detect a newly inserted HDD; and properly establishing communications between the HDD and the host. Serial ATA (SATA) hard disk is designed with 'Hot-Swap' capability. However if it is used as the 'System' hard disk from which the computer first starts and draws its operating system, it is normally connected directly to the data and power cables separately leading out from the motherboard and the internal power supply of the computer and is still used as a 'Fixed' 'System' hard disk. It is not to be swapped when the operating system is running on it and using it as the 'System' hard disk. Used in this way, it should therefore be also covered under this invention. So 'Hot-Swappable' hard disk that is connectedly in one of the way of (a), (b) or (c) described and is used for storing and starting the system image of the operating system controlling the computer should also be covered under this invention. As other hard disks (other than Serial ATA hard disks or hard disks with similar technologies that are fixed internally and from which the computer system is started as defined above) mentioned above are not designed with 'Hot-Swapping' capability, they do not safely meet the above-mentioned challenges. These hard disks cannot therefore be 'Hot-Swapped' without being attached to device(s) especially designed to meet the above-mentioned challenges. Furthermore, if they are used as the 'System' hard disk(s) from which the computer draws the system image of its running operating system and runs the operating system on it, they are again 'Non-Hot-Swappable'. So 'Fixed' 'System' hard disk is 'Non-Hot-Swappable' because either it has no Hot-Swappable' capability or it is used as 'System' hard disk from which the computer starts drawing the system image of its running operating system and runs the operating system on it. Or both, it has no 'Hot-Swappable' capability and it is used as 'System' hard disk and attached as 'Fixed' 'System' hard disk as defined above. There is implementation for 'Hot-Swapping' such 'Fixed' 'System' hard disk, such as found at: http://www.sun.com/products-n-solutions/hardware/docs/html/816-2482-1 1/HDD_RM M_replace.html#91741

However it involves expensive 'Hot-Swap-Enabling' software and hardware and is only available by turning the operating system into a server-based operating system through mirroring the primary boot disk onto the server disk. And such method cannot be employed for standalone desktop computer or mobile notebook computer not connected to Local Area Network. Operating system for starting and controlling a computer has to come from a non-volatile mass storage medium. The above-mentioned 'Fixed' 'System' hard disks are usually used as such a primary non-volatile storage medium or storage device for storing the image of operating systems because they are relatively fast, reliable and cheap. Before the invention of running an operating system entirely in the volatile RAM (Random Access Memory) of a computer, every primary non-volatile storage medium or storage device in a standalone computer had to be fixed because the operating system controlling the computer had to start from and run on it. The advent and the possibility of running an operating system entirely in volatile RAM of a computer makes possible the use of external removeable USB disks or Magnetic-Optical disks or CDROM as the primary non-volatile storage medium so as to make the computer running disklessly. This development is illustrated by the invention, a PCT application, No. PCT/IBOO/00010, Title: Running Microsoft Windows 95/98 on Ramdisk, presented also by the author of the present invention. But these non-hard-disk storage media are relatively slow. At this moment, however most computers and their disk-based operating systems today are running on the above-mentioned 'Fixed' 'System' hard disk (s). And there has never been a revelation how these 'Fixed' 'System' hard disk(s) can be taken out safely for running a computer in a normal manner. Hard disk is a major source leading to computer failure. 'Fixed' 'System' hard disk is subject to daily wear and tear. The world-wide-web phenomenon and the habit of downloading files through internet makes computer virus infection a common headache of computer maintenance. Hard disk is the primary target of any virus attack. And yet, each disk-based computer is equipped with at least one such 'Fixed' 'System' hard disk. The advent of APM (Advanced Power Management) and ACPI (Advanced Configuration & Power Interface) and the developments in the sphere of Hot-Swapping technologies are intended to provide better power management and to increase flexibility and mobility of using a computer, including peripheral devices attached on or to it. Specifications for APM and ACPI can be found at: http://www.microsoft.com/whdc/archive/amp_12.mspx and http://www.acpi.info Now the use of hot-swappable hard disks or hard disks connected to device enabling 'Hot-Swapping' is very common for huge computer servers. Externally connected hot-swappable hard disks, such as MO disks, USB-IDE hard disks and Firewire-IDE hard disks also become in widespread use in personal computers and notebook computers. But one way or another, they are either comparatively costly or relatively slow and involves interface translation, which relies on proper driver support that is not always available.

DISCLOSURE OF INVENTION

Technical Problem

Almost every standalone computer still comes with at least one 'Fixed' 'System' IDE/ATA hard disk(s), which becomes a standard feature that cannot be dispensed with. And what is more, such 'Fixed' 'System' IDE/ATA hard disk is intended or taught to be used as what it is labeled. It is fixed with a screw and put inside the computer. Users are cautioned that it is not 'hot-swappable' or 'hot-pluggable1, i.e. not to be removed while the computer is running; and it is used as the 'System' hard disk from which the computer runs its operating system. But as said before, such 'Fixed' 'System' hard disk(s) is/are the primary headache for computer maintenance.

The present invention provides the fundamental step of solving this problem. It overturns the commonly accepted concept or notion that the 'Fixed' 'System' hard disks that come installed internally with every disk-based computer should be really 'Fixed' and internal when the computer is running. It provides a method for starting a computer from such 'Fixed' 'System' hard disk(s) and running it diskless later or 'diskly' (i.e. with disk) again when necessary.

DESCRIPTION OF THE DRAWINGS

Detailed Description of the Preferred Embodiment

Technical Solution

'Fixed' 'System' hard disk is defined and hereafter referred to as hard disk that is: (a) (i) directly connected to data cable(s) leading out from the motherboard and power cable(s) leading out from the power supply, which is also supplying power to the motherboard of a computer; or (a) (ii) directly connected to data cable(s) leading out from the motherboard and power cable(s) leading out from a separate external or a separate internal power supply, which is not supplying power to the motherboard and other components of the computer; or (b) (i) connected to data cable(s) leading out from a controller interface card directly connected to the system bus of the motherboard and power cable(s) leading out from the power supply, which is also supplying power to the motherboard of a computer; or (b) (ii) connected to data cable(s) leading out from a controller interface card directly connected to the system bus of the motherboard and power cable(s) leading out from a separate external or a separate internal power supply, which is not supplying power to the motherboard and other components of the computer; or (c) connected to a device that is connected in the manner of either (a) or (b) above and that device has no additional support for translating the data input/output interface of the connected hard disk(s) into another type of data input/output interface, for instance from IDE interface into USB interface, to be connected to and identified as such by the computer when the computer starts from every power-on or rebooting and runs or bootstraps or draws the system image of the controlling operating system from such hard disk. This includes, but is not limited to, hard disks of the interface types of IDE/EIDE/ATA/Ultra ATA/SCSI/Ultra SCSI (Integrated Drive Electronics/Enhanced Integrated Drive Electronics/AT Attachment/Ultra AT Attachment/Small Computer Systems Interface/Ultra Small Computer Systems Interface). The above mentioned types of hard disks are industry standards and commonly used and defined as 'Fixed' hard disks as they come, fixed and installed internally, with almost every standalone personal computers or network servers and because the controlling operating system for the computer has to start from and run on these hard disks.

The method revealed by this invention applies to computers that are enabled with or have support for APM or ACPI or similar technologies, running an operating system, capable of being run as a ramdisk-based operating system, that is bootstrapped or started from the 'Fixed' 'System' hard disks defined above to run as a ramdisk-based operating system. Computers produced within the past years are commonly APM or ACPI enabled or have support for such technologies. But the implementation of APM or ACPI or the like technologies varies with different operating systems. Operating systems developed before the advent of APM or ACPI or similar technologies usually do not possess such support or such support may be later provided through patches. Newer versions of operating systems may now be designed with supporting these technologies in mind. But the degree of support in implementation varies very widely. This invention discusses how 'Fixed' 'System' hard disk(s) can be disconnected or reconnected for running computers having varying degrees of support for APM or ACPI or similar technologies; and in particular how a computer can transit from 'diskly' state to 'diskless' state and then back from 'diskless' state to 'diskly' state when there is a need. Nowadays, many operating systems are capable of being totally run in volatile RAM, such as MSDOS, FreeDOS, Microsoft Windows 3.0/3.1, Microsoft Windows 95/98/ME, Linux, FreeBSD, etc. Other operating systems at present not being capable of running in volatile RAM can also be made to have such capability given the will and the time. The present invention basically involves the following steps: 1. Start to run a computer, which has or is enabled with support for APM or ACPI or similar technologies, from 'Fixed' 'System' hard disk(s) and bootstrap the image of the target operating system, which has the capability of being taken to run as a ramdisk-based operating system, to run as a ramdisk-based operating system; 2. Make preparation for removing the need for access by the computer and the operating system to the target 'Fixed' 'System' hard disk(s) and put the computer into a state that the target 'Fixed' 'System' hard disk(s) is/are to be disconnected; 3. Disconnect the target 'Fixed' 'System' hard disk(s) and wake up the computer if necessary; and 4. Re-connect the original 'Fixed' 'System' hard disk(s) or some other 'Fixed' hard disk(s) according to need and the hardware and software capabilities of the computer and wake up the computer if necessary. These steps are to be illustrated with examples drawn from the use of MSDOS, Windows 98, FreeBSD and Linux in running APM or ACPI enabled computers. The use of this invention however is not to be limited to these operating systems and computers. It is re-iterated here that this invention is applicable to those computers with support for APM or ACPI or other technologies with similar capabilities; running an operating system, bootstrapped from the 'Fixed' 'System' hard disk, with capability of being taken to run entirely in volatile RAM of the computer under concerned. The above steps are elaborated as follows: 1. Start to run a computer, which has or is enabled with support for APM or ACPI or similar technologies, from 'Fixed' 'System' hard disk(s) and bootstrap the image of the target operating system, which has the capability of being taken to run as a ramdisk-based operating system, to run as a ramdisk-based operating system The present invention is intended to apply to computers with support for APM or ACPI or similar technologies. The computers are also equipped with 'Fixed' 'System' hard disks as defined above. Computers with these power management capabilities can be put into different states along with the connected 'Fixed' hard disk(s). The precise control of the states of the computer and its 'Fixed' hard disk(s) also varies with the capabilities of the target operating system used. This will be discussed and illustrated with examples in more details in Step 2 below. To be able to 'swap' the 'Fixed' 'System' hard disk(s) from which the computer starts bootstrapping, it is important to be able to run the computer with an operating system capable to be run into a ramdisk-based operating system and to run it as such. One can never swap out a 'System' hard disk on which a hard-disk-based operating system in control of the computer is running. The present step involves first bootstrapping and starting a computer with support for APM or ACPI or similar technologies from the 'Fixed' 'System' hard disk(s). It should start the computer from its 'Fixed' 'System' hard disk(s). And then it bootstraps the image of the target operating system, capable of being run as a ramdisk-based operating system, to run as a ramdisk-based operating system. For instance, for running Windows 98 as a ramdisk-based operating system taking over the control of the computer, the computer must be started into the Real-DOS mode first. The system image of Windows 98 should be suitably prepared beforehand so that it can be taken later to run as a ramdisk-based operating system, taking over the control of the computer. MSDOS can be so prepared likewise to be running as a ramdisk-based Real-DOS mode operating system. Running ramdisk-based Windows 98 is just a further step from running ramdisk-based Real-DOS mode MSDOS. For MSDOS and Windows 98, Windrive International Limited incorporated in the Hong Kong Special Administrative Region of the Peoples' Republic of China, has delivered a program called WINDRV, downloadable at http://windrv.net. It helps prepare a MSDOS Real-DOS mode system image as well as a Microsoft Windows 98 Protected-Window mode system image to run as entirely ramdisk-based MSDOS Real-DOS mode and ramdisk-based Windows 98 Protected-Window mode operating systems. So the sequence of loading ramdisk-based Real-DOS mode MSDOS and ramdisk-based Windows 98 can be: (a) Start a hard-disk-based Real-DOS mode MSDOS, and then bootstrap a hard-disk-based Real-DOS mode MSDOS system image to run as a ramdisk-based Real-DOS mode MSDOS first; and then (b) bootstrap a hard-disk-based Windows 98 system image into a ramdisk to run as a ramdisk-based Windows 98. For standalone computers, the target operating system is bootstrapped from the primary active partition of the designated booting hard disk. The target operating system however may not be or is not necessarily the first operating system being loaded up. A ramdisk-based Linux operating system may be started from MSDOS Real-DOS mode. Such an example is a version of Linux, called BasicLinux. BasicLinux can be booted to run totally as a ramdisk-based operating system from MSDOS Real-DOS mode with the use of a program called LOADLIN.EXE. A modified version of BasicLinux can be found at: http://www.windrv.net/bslnx.zip for downloading and use. Such a ramdisk-based BasicLinux can even be started from the Real-DOS mode MSDOS running already as a ramdisk-based operating system itself. The whole package, including LOADLIN.EXE and the system kernel file, of BasicLinux can be stored as well on the ramdisk created under Real-DOS mode MSDOS before the kernel file is loaded by LOADLIN.EXE to run as another ramdisk-based operating system afresh. So the sequence of bootstrapping a ramdisk-based BasicLinux can be: (c) Start a hard-disk-based Real-DOS mode MSDOS, and then bootstrap a hard-disk-based BasicLinux package to run as a ramdisk-based BasicLinux; or (d) Start a hard-disk-based Real-DOS mode MSDOS, and then bootstrap a hard-disk-based Real-DOS mode MSDOS system image to run as a ramdisk-based Real-DOS mode MSDOS; and from this Real-DOS mode ramdisk, finally bootstrap a ramdisk-based BasicLinux package to run as a ramdisk-based Linux operating system. There are also other ramdisk-based Linux distributions such as Trinux and Knoppix. Knoppix can run as a full-blown Linux with very nice graphical user interface all in RAM. Knoppix can be configured to start booting directly from a 'Fixed' hard disk. The following web links currently point to discussion about how to set up such a ramdisk-based Linux to be booted up from hard disk: http://www.knoppix.net/docs/index.php/Hd-BasedHowTo http://staff.washington.edu/gray/KnoppixCF-guide.html A version or distribution of FreeBSD, called PicoBSD, can boot directly from floppy diskette or from hard disk into RAM as a totally ramdisk-based FreeBSD if its bootable system image is raw-written to a floppy diskette or as an active primary partition of the 'Fixed' 'System' hard disk or is booted using a Real-DOS mode program called BSDBOOT.COM. It should be noted that BSDBOOT.COM should be run under Real-DOS mode without loading any memory managers beforehand. A modified version of PicoBSD can be found at: http://www.windrv.net/pico-boot.zip for downloading and use. Such ramdisk-based operating systems can also be deployed through network if the computer with 'Fixed' hard disk(s) is/are so connected by various remote booting protocols such as Etherboot, RPL or PXE, etc. Once booted up and run into a ramdisk-based state, the target operating system and the computer with 'Fixed' hard disk(s) under concern functions just like the standalone computer booted up from 'Fixed' 'System' hard disk described above. Plenty of examples have been cited to demonstrate that nowadays operating systems can be made to run entirely in volatile RAM with sophisticated functionalities no less than any hard-disk-based operating systems. Other operating systems not having the functions of running itself totally in RAM are either due to the lack of the will, or the lack of the time on the parts of the software developers or the inadequacies of the original infrastructural design of the particular operating system under concern. This has nothing to do with the present invention. After booting computers enabled with support for APM or ACPI or similar technologies into a state running with ramdisk-based operating system, one has to enter into Step 2 below. 2. Make preparation for removing the need for access by the computer and the operating system to the target 'Fixed' 'System' hard disk(s) and put the computer into a state that the target 'Fixed' 'System' hard disk(s) is/are to be disconnected After the target operating system is loaded to run totally in RAM as a ramdisk-based operating system, here comes the stage of making preparation for removing the 'Fixed' 'System' hard disk(s) from the computer. For operating systems such as MSDOS, Microsoft Windows 98 or Linux or FreeBSD and the like, a totally ramdisk-based operating system requires that all the system files or application files or data files that are required for frequent operation are all placed in RAM for constant use or access; the operating system under concern can then run normally without having the need to access hard disks anymore, including the hard disk on which the operating system image is stored and from which the target operating system image is drawn to run as ramdisk-based operating system. Other application files or data files can of course be put or stored on the 'Fixed' hard disk(s), including 'Fixed' 'System' hard disk(s) for access in case of need. However, in order for any particular 'Fixed' hard disk(s) to be removed, the need for access to such hard disk(s) should first be satisfied and then there should not be any need for accessing such hard disks by the operating system and the applications running in it. Furthermore, Windows 98 or Linux or FreeBSD sometimes use some disk space for swapping during its operation. Some such swap files or swap partitions should also be configured to reside on the ramdisk as well. These operating systems however can be configured not to use such swap space. As all the files needed to be accessed have been put into RAM, and there is no longer any need for access to files stored on the 'Fixed' hard disk(s), these hard disk(s) can be prepared for removal. The preparation for removal of such hard disk(s) means that during the period of the removal, such hard disk(s) are understood to be in an inaccessible state to the computer. Any system or application access to the hard disk(s) under concern has to be stopped before removal, including disk-caching activities. Disk caches have to be flushed and the hard disk(s) have to be stopped by the operating system and the computer under user instruction by, for instances, pressing a Function Key on the keyboard or clicking the mouse on a particular application or system utility running on the operating system of the computer. This involves flushing disk caches and spinning down the hard disk(s) under concerned. The target operating system has also to be instructed to logically remove, hide, disconnect or ignore the existence of the particular hard disk(s), which is/are to be removed later. So this Step includes five individual sub-steps: (a) remove all need for access to the 'Fixed' 'System' hard disk(s) under concern by the operating system and the applications running therein; (b) flush software disk caches for such hard disk(s); (c) flush hardware disk caches for such hard disk(s); (d) spin down or stop such hard disk(s); (e) logically remove or hide or disconnect such hard disk(s) so that the operating system ignores or becomes unaware of the existence of such hard disk(s) at the filesystem level and/or on its device list; and (f) put the computer into 'Standby' or 'Suspend to RAM' state according to need. The 'Standby' state by and large corresponds to the APM Standby state as defined in the Advanced Power Management BIOS Interface Specification Revision 1.2 by Intel Corporation and Microsoft Corporation; or to the S1 or S2 Sleeping state as defined in the Advanced Configuration and Power Interface Specifications Revision 2.0c by Compaq Computer Corporation, Intel Corporation, Microsoft Corporation, Phoenix Techologies Limited and Toshiba Corporation. In these specifications, the 'Suspend to RAM' state here corresponds to the APM Suspend state or to the S3 Sleeping state. The actual implementation of the 'Standby' state and 'Suspend to RAM1 varies with the software utilities, the operating systems, the computer hardware platforms as well as the BIOS configuration of the computer as chosen by the user. But the specifications mentioned above provide a general guideline and a broad scope for such correspondence and semblance amongst different implementations of different standard commands under different operating systems. So it is worthwhile to explore how such states are actually implemented for different operating systems for different computer hardware configurations. This will be discussed later. The implementation of these sub-steps may be carried out through the use of different commands in different operating systems. Some command in a particular operating system may perform only one such sub-step while another command in another operating system may perform more than one such sub-step. The sequence of performing these sub-steps is usually (a) to (b) to (c) to (d) to (e) and then to (f); but sometimes some steps may be interchangeable in order, for instance, for some operating system, the order from (d) to (e) may change to the order from (e) to (d) and the effect is the same. And as said earlier, some single command under a particular system may perform more than one sub-step, for instance, sub-steps (c), (d) and (e) together. And their sequence of implementation, for instance, either from sub-step (c), (d) to (e) or from sub-step (e) to (c) and then (d) is up to the particular operating system under concern. The implementation of these sub-steps is better illustrated by examples under different operating systems as described below. Under all operating systems, to perform sub-step (a), one has to stop or close all applications that have access requirements on the particular hard disk(s) under concern. To flush software disk caches, i.e. sub-step (b), one has to perform relevant command(s) offered by the disk caching software that one is using for the particular operating system under concern or to issue programming instructions to the same effects. Flushing software disk caches is sometimes performed automatically by the operating system under concern when one is attempting to spin down or logically hide or disconnect the hard disk(s). Under Real-DOS mode MSDOS, after flushing the software disk caches, for instance, one can use a FreeDOS utility to perform sub-steps (c) and (d) together. This utility, called FDAPM, is described at: http://www.freedos.org/freedos/software/lsm.cgi?q=f&a=base/fdapm.lsm and available at: http://www.coli.uni-sb.de/~eric/stuff/soft This is done by issuing the command under DOS prompt or through calling batch file or through programming instructions: 'fdapm spindown' To perform spinning down the hard disk(s), the command 'fdapm spindown' will first try to flush the hardware disk caches and then spin the hard disk(s) down. To perform sub-step (e) at the filesystem level, one can use the 'subst' command that comes with MSDOS itself to logically hide all the drive letter(s) that are associated with the hard disk(s) under concern. There is at present no commonly available standard command that can help remove the hard disk(s) under concern from the device list held by MSDOS. If there is a need, one can do the necessary programming to develop such a utility. Such utility however is available for Linux or FreeBSD as described later below. One however can perform 'subst' command before using 'fdapm spindown' command. The effect is about the same under MSDOS. To perform sub-step (f), one can issue: 'fdapm apmdos' and then 'fdapm standby' to put the computer into 'Standby' state, i.e. generally speaking, corresponding to APM Standby state or S1 or S2 sleeping state mentioned above; for some implementation, a state in which the CPU, the screen, the hard disk(s) are turned off, while the power supply connecting to these components is still actively on for them to draw on should they be instructed to wake up; a state that is less power-saving than the 'Suspend to RAM1 state below; or issue: 'fdapm apmdos1 and then 'fdapm suspend1 to put the computer into 'Suspend to RAM1 state, i.e. generally speaking, corresponding to APM Suspend state or S3 sleeping state mentioned above; for some implementation, a state in which the computer is nearly completely power-off except that only the content in RAM is preserved in RAM itself with just a little power drawn from the power source for maintaining the content in RAM so that the content of RAM does not disappear. The exact responses of the computer when receiving these commands depend on how well or faithfully the computer hardware implements the specifications of APM or ACPI or similar technologies. It may also be affected by how the user chooses the BIOS configuration settings in relation to the Power Management of the computer; for instances whether the user prefers to permit the computer to be put into 'Standby' or 'Suspend to RAM' state or not. And sometimes the user may choose to put the computer into 'Hibernation' state in which when the computer receives an instruction to 'stop' or 'standby', the computer will translate it into an instruction to 'hibernate'. 'Hibernation' state tells the operating system or the computer to save the content of the RAM into a file on the hard disk before it powers off. However, some operating system may not be built with the capability for 'Hibernation', it is then up to the computer hardware to do the 'Hibernation' action or to do the translation of the 'stop' or 'standby' instruction into either 'Standby' state or 'Suspend to RAM1 state or a complete 'Power Off state in accordance with the BIOS configuration settings chosen by the user as well as the design and hardware capabilities of the computer itself. Under Microsoft Windows 98, one has to stop or close all applications that have access requirements on the particular hard disk(s) under concern for sub-step (a). Then it is simple to perform all other steps under this operating system. That is, after one has performed sub-step (a), one can proceed to perform sub-step (e) at the filesystem level by issuing the 'subst' command within a virtual DOS windows. Provided that one is not using other third-party software caching utility (in which case, one has therefore to do it separately according to the requirements of the third-party software under use), the operating system will handle and flush the system software disk cache automatically by default when one tries to issue the 'subst' command under Protected-Window mode. The 'subst' command also checks whether all the access needs by the operating system and other applications are satisfied. If not, 'subst' command fails and reports that it cannot do the substitution. So one should do all that is required to remove all the access requirements on the particular drive(s) that one wants to use the 'subst' command for. After the 'subst' command is successful for all target drives, one can then put the operating system to 'Standby' mode. By putting the operating system to 'Standby' mode under Protected-Window mode, one makes the operating system to flush the hardware disk cache, spin-down the hard disk(s), as well as to put the computer to a nearly power-off state, except that only the content of RAM is preserved in RAM, using just a little power supply from power source. The 'Standby' mode can be accessed to or chosen by using the Start Menu when one wants to exit Windows 98. One of course can make a small program or utility to perform similar function. If one cannot perform this function normally, this may be due to the fact that some program or application is preventing Windows to exit to 'Standby' mode. Microsoft provides a small utility at its website to help ascertain the problem and find out which is the offending program or application. One can then remove the offending program or application for exiting to 'Standby' mode. So it is simple for Microsoft Windows 98 to do it for computers with support for APM or ACPI. One has just to close all applications accessing the 'Fixed' 'System' hard disk(s), i.e. sub-step (a); issue 'subst1 command at filesystem level for all drives belonging to the 'Fixed' 'System' hard disk(s) under concern for flushing the system software disk caches, i.e. sub-step (b), and for logically hiding them, i.e. sub-step (e); and finally put the computer in 'Standby' mode. This last action performs sub-step (c), flushing hardware disk cache; sub-step (d), spinning down the 'Fixed' 'System' hard disk(s). What is more, this last action of putting the computer into 'Standby' mode actually does all these sub-steps (b), (c) and (d) for all hard disks, whether 'Hot-swappable' or not, and in addition, performs sub-step (f)—turning the computer to 'Suspend to RAM' state, i.e. nearly completely power-off except that only the content in RAM is preserved in RAM with just a little power drawn from the power source for maintaining the content in RAM so that the content does not disappear. Under Microsoft Windows 98, the 'Standby' mode is equivalent to the 'Suspend to RAM' state; and there is no standard way of putting the computer into 'Standby' state as in the Real-DOS mode MSDOS. One may of course do some programming to do the same effects. Under BasicLinux, after closing all applications with access need on the 'Fixed' 'System' hard disk(s) and flushing software disk caches for such hard disk(s), i.e. sub-steps (a) and (b), the relevant standard commands for sub-step (c) is 'hdparm-f device'; where device stands for the hard disk under concern; it can be Vdev/hda1, Vdev/hdb' and so on. So to flush the first hard disk, one can issue: 'hdparm-f/dev/hda' to flush the second hard disk, the command becomes: 'hdparm-f/dev/hdb1 For BasicLinux, before performing sub-step (d), it is necessary or advisable to perform sub-step (e) to logically hide the target hard disk(s) or their partitions from the operating system at filesystem level if such hard disk partitions have been 'mounted' up for use. This is by issuing the 'umount' command. One can use the 'hdparm-U1 to unregister the target hard disk(s). This also represents logically hiding the device at device list level, i.e. substep (e) at device list level. Depending on implementation, this command may take steps to flush disk caches and spin down the target hard disk(s) as well, i.e. substep (c) and (d). It however should be noted that the implementation of this 'hdparm-U' command in most cases is not very functional at the present moment at least for some machines. This may be the result of software implementation and/or different hardware responses. To perform sub-step (d), one can spin down the first hard disk by issuing: 'hdparm-y/dev/hda' This switch -y (small capital y) tells Linux to spin down the first hard disk. To completely stop it or shut it down or put it to the lowest power consumption 'sleep' mode, one can issue the -Y (large capital Y) switch for the device: 'hdparm-Y/dev/hda' Under BasicLinux, this command, 'hdparm-Y' may require a hard or soft reset before the hard disk(s) under concern can be accessed again. So if one wants to re-use the device later without re-booting, one should not use this 'hdparm-Y' command. Sub-step (f) is achieved under Linux by issuing: 'apm-s' to put the computer into 'Suspend to RAM' state; and by issuing: 'apm-S' to put the computer into 'Standby' state. The implementation of the 'hdparm' and 'apm' commands however varies with the computer hardware and the particular Linux kernel versions. Some computer hardware may not respond in such as way that the commands are expected to produce. For instance, the 'hdparm-U' is not always functional for some computer hardware. For some machines, the 'apm-s1 may put the computer into sleep but it cannot wake up if one has issued 'hdparm-Y' command beforehand or takes away the 'Fixed' 'System' hard disk(s) during the 'Suspend to RAM' state. One should also take care about spinning or shutting down the target hard disk(s) when there is other device connected to the same channel as the target hard disk(s), such as CDROM. IDE controller supports two devices per cable or per channel. To avoid side effects, it is recommendable to perform the same sets of commands to the devices attached to the same channel for enabling the devices or disabling the devices. For this reason, FreeBSD at present treats the devices attached to a channel as one and has standard command for attaching or detaching such devices as a single channel as introduced below. For PicoBSD, after performing relevant commands or programming instructions for sub-step (a) and (b), to perform sub-step (c), one can use the following command: 'sync' This 'sync' utility 'forces pending completion of disk writes1, i.e. flushing cache. To logically hide the target hard disk(s) or their partitions from PicoBSD at filesystem level if such hard disk partitions have been 'mounted' up for use, one has to issue the 'umount' command just like in Linux. This sub-step (e) is at the filesystem level. To perform sub-step (d) and (e) at device list level together, one can issue: 'atacontrol detach 0' for detaching the first ATA channel of the hard disk(s) attached; and 'atacontrol detach 1' for detaching the second ATA channel of the hard disk(s) attached. There are no standard atacontrol commands at present for separately spinning or shutting down a particular hard disk or logically removing, or hiding or disconnecting it. The above command performs both sub-steps together for all hard disk(s) or other devices such as CDROM attached to a particular ATA channel. It is noticed that attempts are being made to do the refinements or enhancements. For performing sub-step (f), one can issue: 'apm-e 1' and then 'zzz' or 'apm-e 1' and then 'apm-z' to put the computer into 'Suspend to RAM' state; or to issue: 'apm-e I1 and then 'apm-Z' to put the computer into 'Standby' state. Enough has been said by giving examples of different commands used under different operating systems to perform the sub-steps required for this Step 2 as a whole. It should be noted that different operating systems have different standard commands to perform these different sub-steps in different ways and in different combinations. Finer enhancements of programming of course can be done for each of these operating systems for achieving each of these sub-steps both separately and/or hi tandem for achieving the purpose of this Step 2. It should however be noted that by citing different examples for different operating systems, it is demonstrated that the present invention introduces a method the use of which can be generally applied to other operating systems in computers complying with APM or ACPI or similar technologies with 'Fixed' 'System' hard disk(s) with operating system capable of being taken to run as ramdisk-based operating system. The actual programming implementation for different operating systems may be different. However, given the will and time, operating systems without standard commands or applications to implement the method introduced by this invention can be made to do so and produce the same effects as demonstrated by the examples cited in this invention. That means the method introduced by this invention is technically feasible and can be actually implemented in many operating systems already, though not previously revealed as such. 3. Disconnect the target 'Fixed' 'System' hard disk(s) and wake up the computer if necessary There are some subtleties for disconnecting the target 'Fixed' hard disk(s) from the computer. To completely disconnecting such hard disk(s) physically from the computer, it is represented by the act of physically disconnecting thoroughly by hand or through other device(s) the power and data cables connected to the hard disk(s) under concern. There are already physical devices, called variously as 'IDE Hard Disk Mounting Kit1, 'Hard Disk Inner Rack', 'Mounting Bay', 'Removeable Hard Disk Caddy', 'IDE Hard disk Enclosure', etc. for easily disconnecting the 'Fixed' hard disk(s) physically from the computer. These devices have hitherto been used for helping pulling out the 'Fixed' hard disk(s) from the computer when it is completely power-off. That is these devices are designed for 'Cold Swap' or 'Cold Plug'—both for 'Cold Disconnection' and 'Cold Connection'. They however can be used for the same purpose under this invention for physically disconnecting the 'Fixed' 'System' hard disk(s) from the computer during the 'Standby' or 'Suspend to RAM' state when the operating system is running into ramdisk-based. The best implementation of this invention is to physically disconnect the 'Fixed' 'System' hard disk(s) under 'Suspend to RAM' state with the operating system notified or instructed that such hard disk(s) should be removed from its device list. But because the standard commands available for different operating system implement the steps outlined by this invention in different ways and in different degrees of completion, one may not always obtain the optimal state of implementation. However, given the will and the programming efforts, the optimal state of implementation of this invention can be achieved for any operating system. And even with the standard commands available for the operating systems under discussion, it is observed that normal operation of the computer system can be achieved. This is elaborated in more details under the section of 'Best Mode for Carrying out the Invention'. It has been discussed above about how standard commands available for each of these operating systems can be used in combination to put the computer into either the 'Standby' state or the 'Suspend to RAM1 state. The state in which the 'Fixed' hard disk(s) can be physically disconnected without affecting normal operation of the computer however varies with operating system and the computer hardware under concern. This is best to be illustrated with examples below. Under Real-DOS mode MSDOS, for IBM Thinkpad X23 notebook computer, the computer cannot wake up after 'Suspend to RAM1 state if the target 'Fixed' 'System' hard disk is taken away during the 'Suspend to RAM' state. The computer however can wake up and perform normally after the 'Standby' state during which the target hard disk is taken away. For computers similar to IBM Thinkpad X23, without some modifications to hardware or software applications, the sequence of optimal implementation of Step 2 of this invention—performing sub-steps (a) to (e) and putting the computer into 'Suspend to RAM' state, physically disconnecting the target hard disk(s), waking up the operating system and the computer for normal use—cannot be achieved. One however can instead do the following sequence of Step 2—performing sub-steps (a) to (e) and putting the computer into 'Standby' state, physically disconnecting the target hard disk(s), waking up the operating system and the computer for normal use. Under BasicLinux, as said before IBM Thinkpad X23 cannot wake up from 'Suspend to RAM1 state if 'hdparm-Y1 is issued, 'hdparm-U' command also is not effective. And the sequence of Step 2—performing sub-steps (a) to (e) and putting the computer into 'Suspend to RAM' state, physically disconnecting the target hard disk(s), waking up the operating system and the computer for normal use—does not work. Like under Real-DOS mode MSDOS, the sequence of Step 2 cited above with the sub-step of putting the computer into 'Standby' state however does work. PicoBSD does not run at all in IBM Thinkpad X23. The best implementation amongst all the operating systems cited above for IBM Thinkpad X23 is to run it under Windows 98. One can run the optimal sequence of Step 2 without problem—performing sub-steps (a) to (e) and putting the computer into 'Suspend to RAM' state, physically disconnecting the target hard disk, waking up the operating system and the computer for normal use. The optimal sequence of implementation of Step 2 of the method revealed in this invention—performing sub-steps (a) to (e) and putting the computer into 'Suspend to RAM1 state, physically disconnecting the target hard disk(s), waking up the operating system and the computer for normal use—so far assumes that the 'Fixed' 'System' hard disk(s) is/are connected to the computer in the usual way, i.e. both the data cable(s) and the power cable(s) are directly connected between the hard disk(s) and the motherboard and the internal power supply of the computer. The internal power supply is supplying power to the motherboard and the hard disk(s) simultaneously. Performing sub-steps (a) to (e) of Step 2 is for making effective steps for logically disconnecting the target hard disk(s) from the awareness of the operating system and the computer. To put the computer into 'Suspend to RAM 1 state is the optimal way of avoiding the hazards prevented by 'Hot-Swap', i.e. about controlling electrostatic charges and sudden voltage changes due to 'Hot Disconnection'. Instead of Hot Disconnection', one can thus use this 'Cool Disconnection' method—the optimal implementation of Step 2 by putting the computer into 'Suspend to RAM1 state in sub-step 00—It is however found that for computers that are not able to effect the optimal sequence of implementation under a particular operating system, the sub-optimal sequence of Step 2, i.e. after performing sub-steps (a) to (e), putting the computer into 'Standby' state for sub-step (f) instead of 'Suspend to RAM1, does work for them, i.e. they run normally without problem. This represents 'Warm Disconnection'—a sub-optimal implementation of Step 2 by putting the computer into 'Standby' state. This 'Warm Disconnection' may present hazards due to electrostatic discharges and sudden voltage changes. But such hazards are less than that experienced if only sub-steps (a) to (e) of Step 2 are performed, i.e. 'Hot Disconnection', without performing sub-step (f). 'Warm Disconnection' and 'Hot Disconnection' are therefore not recommended under the above assumption that the 'Fixed' 'System' hard disk(s) is/are connected to the computer in the usual way, i.e. both the data cable(s) and the power cable(s) are directly connected between the hard disk(s) and the motherboard and the internal power supply of the computer and the internal power supply is supplying power to the motherboard and the hard disk(s) simultaneously. This is also the case for such 'Warm Disconnection' and 'Hot Disconnection' when the target hard disk(s) is/are connected to the motherboard and the internal power supply of the computer through intermediate device without 'Hot-Swap' capability, such as those devices introduced earlier for simple 'Cold Swap'. It is however noted that because of this invention, the usual connection between the 'Fixed' hard disk(s), including 'Fixed' 'System' hard disk(s), and the computer may have to be re-designed so that the 'Fixed' hard disk(s) are to be powered separately by another switchable internal power supply for only the purpose of powering these target hard disk(s) or to be powered separately by separate external power supply. Or the 'Fixed' hard disk(s) is/are turned into external hard disk(s), not to be accommodated within the computer case itself. The computer therefore simply puts out ports of data cable(s) for connecting such hard disk(s) to the motherboard of the computer, just like other serial ports, such as the standard serial RS-232 corn ports or the standard parallel printer port. Hard disk(s) is/are then to be separately powered just like modem or printer, etc. If separately powered, the 'Fixed' hard disk(s), including 'Fixed' 'System' hard disk(s) become 'Cold-Swappable' when computer is completely power-off, 'Cool-Swappable' when computer is under 'Suspend to RAM' state, 'Warm-Swappable' when computer is under 'Standby' state, and Hot-Swappable' when computer is under normal operation. For turning these hard disk(s) into 'Cool-Swappable' state, one has of course to perform Step 2, including sub-steps (a) to (e) and sub-step (f) to put the computer in 'Suspend to RAM1 state. For turning these hard disk(s) into 'Warm-Swappable' state, one has to perform Step 2, including sub-steps (a) to (e) and sub-step (f) to put the computer in 'Standby' state. For turning these hard disk(s) into 'Hot-Swappable' state, one has to perform Step 2, including sub-steps (a) to (e) only; and Step 2 (f) becomes the step of just leaving the computer in the normal running state. So the 'Fixed' hard disk(s), including 'Fixed' 'System' hard disk(s) discussed here, if powered by a separate internal power supply or powered by an external power supply, can then be swapped out under all the 'Cold1, 'Cool', 'Warm' and 'Hot' states after taking the necessary steps as described above. One can therefore decide in which state to swap these hard disk(s) out and actually swap them out after taking the necessary steps described above according to different needs. The sequence of disconnecting the connection of the hard disk(s) with the computer is to first disconnect the data cable connection and then to disconnect the power cable connection of the end of the hard disk(s) or simply switch off the separate internal power supply or the external power supply. After removing the target hard disk(s), one can decide to go on to Step 4 below for reinserting some other hard disk(s) or to wake up the computer for use if it is put into a 'Standby' state or 'Suspend to RAM' state. One should check with the computer handbook about how the computer can be wakened up from these states. The usual ways for waking up the computer is either to press a Key or a Function Key or to press the power on/off button of the computer or to move or click on the mouse. This invention also offers a way for re-designing the computer to make the computer to either power the hard disk(s) with a separate internal power supply or to simply provide ports for hard disk data cable(s) just like other serial or parallel port for other devices and to let the users to power such hard disk(s) using external power supply, such as external batteries. In such a way, users then have the freedom to use such 'Fixed' hard disk(s) under whatever states they want. Should they wish to 'Hot-Swap' them, there will be no need for high-cost 'Hot-Swap' devices. 4. Re-connect the original 'Fixed' 'System' hard disk(s) or some other 'Fixed' hard disk(s) according to need and the hardware and software capabilities of the computer and wake up the computer if necessary The sequence of physically re-connecting the connection of the hard disk(s) with the computer is to first connect the power cable connection of the hard disk(s) or simply switch on the separate internal power supply or the external power supply and then to connect the data cable connection of the hard disk(s) with the motherboard of the computer. After re-connecting the hard disk(s), it is important to note that some seconds of time should be given for the hard disk(s) to adjust to the condition of being powered up and to settle before re-running the computer in normal way. After re-connecting the target hard disk(s), one can continue to wake up the computer for use if it is put into a 'Standby' state or 'Suspend to RAM' state. One should check with the computer handbook about how the computer can be wakened up from these states. The usual ways for waking up the computer is either to press a Key or a Function Key or to press the power on/off button of the computer or to move or click on the mouse. Assuming the 'Fixed' hard disk(s), including 'Fixed' 'System' hard disk(s), is/are connected in the usual way, i.e. both the data cable(s) and the power cable(s) are directly connected between the hard disk(s) and the motherboard and the internal power supply of the computer and the internal power supply is supplying power to the motherboard and the hard disk(s) simultaneously, the way of re-connection of such hard disk(s) or other hard disk(s) of similar types varies the state of the computer, i.e. 'Standby' state or 'Suspend to RAM' state, as well as the operating system under concern. This is further illustrated below. Under Real-DOS Mode MSDOS, re-connecting hard disk(s) under 'Suspend to RAM' state, i.e. 'Cool-Swap' does not have the hazards associated with 'Warm-Swap' under 'Standby' state discussed below. And 'Cool-Swap' is the recommended way for re-connection, assuming the 'Fixed' 'System' hard disk(s) is/are connected in the usual way as described above. If the computer is put into 'Standby' state, it is not recommendable to re-connect the original hard disk(s) or re-insert other hard disk(s) back into the computer because of the existence of the hazards of electrostatic discharges and sudden voltage changes associated with 'Warm-Swap' under this 'Standby' state. However, if one risks the hazards, after re-inserting or re-connecting the hard disk(s), one can use the command: 'subst [drive:]/d' to remove the logical disconnection or to introduce the new connection for those hard disk partitions that one wants to restore. If the hard disk re-inserted is a new hard disk with 3 partitions and the original one has 2 partitions, the user can remove the logical disconnection for only 2 drives and the user is not above to see all 3 partitions of the new hard disk. By the same token, if one removes only one hard disk and re-insert two hard disk(s), the additional hard disk attached to the new data cable port cannot be seen by the operating system. It is further assumed that the new hard disk partitions are all in readable formats, such as FAT1 6 or FAT32. Other partitions formats are not readable without installing corresponding filesystem drivers for them. But the operations of installing and running foreign filesystem drivers may not be smooth or may introduce errors or even hang the computer, depending on how well is the implementation of such filesystem drivers of foreign formats and how well such drivers are integrated or co-operating with the native operating system. The above description also applies to running Windows 98. Except that the standard command for Windows 98 is to put it into 'Suspend to RAM' state, during which re-connecting hard disk(s) imposes no hazards. After re-connection, one has to issue relevant 'subst [drive:]/d' commands under DOS Window of the Protected-Window mode of Windows 98. Under BasicLinux, physically re-connecting hard disk(s) under 'Standby' state is similar to that under Real-Dos mode MSDOS. And if 'hdparm-U' works well in Step 2 for un-registering the target channel(s) for the target hard disk(s), re-connection will have less hazards than that performed under Real-DOS mode MSDOS. Re-connection under 'Suspend to RAM' state of course poses no problems. After re-connecting the hard disk(s), one can perform the command 'hdparm-R' with appropriate parameters to re-introduce the hard disk(s) to the operating system at device list level. To re-introduce the hard disk partition(s) at filesystem level so that user can make use of it, the hard disk partition(s) should also be in readable formats. The standard command is 'mount' with appropriate parameters for the device under concern. The standard 'hdparm' and 'mount' command have more options than the counterpart under Real-DOS mode MSDOS and under Windows 98 and one may use 'hdparm-R' to introduce newly added hard disk(s). This again is subject to how well is the implementation of the command under a particular version of Linux and its effects on the computer hardware under concern. If 'hdparm-R' does not work, the standard 'mount' command may perform the function for it as well when the operating system attempts to use a particular hard disk partition. For PicoBSD, physically re-connecting hard disk(s) under 'Standby' state is similar to that under Real-Dos mode MSDOS and BasicLinux. The 'atacontrol detach' command as described in Step 2 however seems to work quite well on computers that are compatible with FreeBSD for detaching the target channel(s) for the target hard disk(s), re-connection of hard disk(s) will have less hazards or will be more stable than that performed under the other two operating systems, Real-DOS mode MSDOS and Linux. Re-connection under 'Suspend to RAM' state of course poses no problems. After re-connecting the hard disk (s), one can perform the command 'atacontrol attach1 with appropriate parameters to re-introduce the hard disk(s) to the operating system at device list level. The 'atacontrol attach1 command re-initializes the data channels. As said before for IDE controller, one can connect two devices to each data channel and 'atacontrol attach' performs the function of re-initialization for all two devices attached to the channel under concern, 'atacontrol attach O' is for the first channel and 'atacontrol attach I' is for the second channel, for connecting devices attached them at device list level. After this, one can use the 'mount' command with appropriate parameters to introduce the particular hard disk partitions to the operating system at filesystem level. Again, such hard disk partitions should be in readable formats and have the corresponding modules or drivers compiled in the kernel for reading these partitions.

Advantageous Effects

However, if the 'Fixed' hard disk(s), including 'Fixed' 'System' hard disk(s) is/are separately powered by another separate internal power supply or by an external power supply not supplying power to the motherboard and other devices, and if these hard disk(s) are only connected to the motherboard through data cable(s), it is safe to 'Hot-Swap', 'Warm-Swap', 'Cool-Swap' and 'Cold-Swap' in and out, cycling through Step 2 to Step 3 then waking up and then Step 2 to Step 4 and waking up and then Step 2 so on and so forth as described above. Assuming that the 'Fixed' 'System' hard disk(s) is/are connected to the computer in the usual way, i.e. both the data cable(s) and the power cable(s) are directly connected between the hard disk(s) and the motherboard and the internal power supply of the computer and the internal power supply is supplying power to the motherboard and the hard disk(s) simultaneously, the recycling from 'diskly' state to 'diskless' state is best through putting the computer in 'Suspend to RAM' state for both Step 3 and Step 4. This 'Cool-Swap' is a safeguard against hazards described earlier associated with 'Warm-Swap'. 'Hot-Swap' under this situation is too dangerous and risks hardware failure or destruction. By cycling through Step 2 to Step 3 then waking up and then Step 2 to Step 4 and waking up and then Step 2 so on and so forth, one can therefore turn the computer from 'diskly' state to 'diskless' state and vice versa again and again under optimal circumstances.

Best Mode

It is found that by using Fujitsu Life Series S-4545 notebook computer, under the usual way of connection, i.e. the 'Fixed' 'System' hard disk shipped with the computer being connected normally in the usual way with data cable and power cable connected with the motherboard and internal power supply of the computer, all the steps for all operating systems described previously can be implemented without problems for 'Cool-Swap'. That is, after performing Step 1 above, one can cycle through Step 2 to Step 3 then waking up and then Step 2 to Step 4 and waking up and then Step 2 so on and so forth under 'Suspend to RAM' state for normal operation. Recycling through Step 2 to Step 3 then waking up and then Step 2 to Step 4 and waking up and then Step 2 so on and so forth under 'Standby' state is however having some difficulties. Under Real-DOS mode MSDOS, the computer may hang after 2 or 3 cycles if not handled properly. So it does not guarantee to work. Under BasicLinux, such recycling may sometimes produce error messages about the data channel under concern. But if logical disconnection for the swapping is properly administered, the computer appears to be able to sustain through many cycles of such recycling. Under PicoBSD, there however appears no problem of such recycling both for 'Suspend to RAM' state as well as for 'Standby' state. Therefore, comparing the degree of thoroughness of implementation of the above Steps described in this invention, PicoBSD seems to allow more direct control for each steps of implementation; for instance, it can allow direct control on the logical disconnection and re-connection of the hard disk(s) through the use of standard commands such as 'umount1 and 'mount' at the filesystem level, as well as 'atacontrol detach' and 'atacontrol attach1 at the device list level. Finer enhancement could be done for allowing users to separately attach or detach a device to and from a particular data channel. For recycling through Step 2 to Step 3 then waking up and then Step 2 to Step 4 and waking up and then Step 2 so on and so forth, it seems that the 'Suspend to RAM' state is the best mode of operation and Windows 98 using the 'Suspend to RAM' state (or named by Windows 98 as 'Standby' mode') is found to be the best and the most stable of all the operating systems for different computer hardware under discussion.

Mode for Invention

The best mode for carrying out the invention for IBM Thinkpad X23 computer notebook is again using Windows 98 in 'Suspend to RAM' state for swapping in and out the 'Fixed' 'System' hard disk. Real-DOS mode MSDOS fails in waking up after taking out the hard disk during 'Suspend to RAM' state. This is also the case for BasicLinux. For Real-DOS mode MSDOS and BasicLinux, though they can wake up after the hard disk being taken out during 'Standby' state, re-connecting the hard disk(s) risks hazards of electrostatic discharges and sudden voltage changes. This makes recycling through Step 2 to Step 3 then waking up and then Step 2 to Step 4 and waking up and then Step 2 so on and so forth not guaranteed. PicoBSD does not run under IBM Thinkpad X23 as mentioned before. So running computers in 'Standby' state for swapping hard disk(s) connected in the usual way as described before is not a guaranteed method. It does work for the first time but re-cycling through Step 2 to Step 3 then waking up and then Step 2 to Step 4 and waking up and then Step 2 so on and so forth may usually prove to be a failure under certain operating system such as Real-DOS mode MSDOS. It is however noted that it works perfectly alright under PicoBSD under certain computer hardware which is compatible to FreeBSD, such as in this case, Fujitsu Life Series S-4545 notebook computer. Powering the 'Fixed' hard disk(s), including 'Fixed' 'System' hard disk(s), with a separate internal power supply or an external power supply can reduce the hazards due to disconnection or re-connection of power supply cable(s). The disconnection and re-connection of data cable(s) during state of logical disconnection at file-system level and/or at device list level provides another shield against failure. It however should be noted that as IDE controller can connect two devices under the same data channel, care should be taken to provide for proper logical disconnection of all the devices attached under the same data channel. This invention therefore provides a method that facilitates the swapping of 'Fixed' hard disk(s), in particular 'Fixed' 'System' hard disk(s), especially for standalone personal computers or mobile notebook computers in a relatively convenient way without having to employ sophisticated devices for 'Hot-Swapping'.

INDUSTRIAL APPLICABILITY

This invention reveals a method for the final removal of the last headache for standalone computers running with the 'Fixed' 'System' hard disk(s). Such hard disk(s) are relatively cheap and fast. The dawning of the Internet era comes with the phenomenon of widespread use of web browsing, email exchanges, peer-to-peer online communications and sharing of files. This creates a hotbed for virus infections. Virus infections frequently target the 'System' disk(s) as the victim. 'Hot-Swappable' removeable storage media such as USB-IDE hard disk, MO disk, bootable CDROM, etc. can be easily removed after booting up a ramdisk-based operating system. But the use of such removeable storage media is relatively slow, about 10 or more times slower than using the 'Fixed' 'System' hard disk(s) having the industry-standard IDE/ATA interfaces as the booting media. By using the method introduced in this invention, any standalone computer can now do away with the 'Fixed' 'System' hard disk(s) and the headaches of virus infections and computer failures due to constant wear and tear associated with such hard disk(s). A clean 'Fixed' 'System' hard disk can be used for booting any number of computers of same or similar hardware configuration to run with ramdisk-based operating system for operating system that is capable of such running method. This helps in computer maintenance. It is especially useful for organization with standard configuration for a number of computers. Such as a school or any office with a number of standard computers, as well as net bar or net kiosk. For any number of standard computers, a system image stored on such a hard disk is sufficient. Should the computer configuration differ from one machine to another, a hard disk of 120 Gb can provide for more than 100 computers with system image of about IGb in size. For any operating system that can be run in compressed format such as Windows 98, this IGb system image size can represent about 2 Gb ramdisk-based operating system image, which is more than sufficient for most system configuration and application use. This method of deploying ramdisk-based operating system to any computers through booting up from industry-standard hard disk(s) can also serve as a substitute for remote network booting. Configuration for successful implementation of remote network booting methods is still a challenge and sometimes presents problems to ordinary technicians who are not so familiar with the skills required, especially when new computer hardware, such as new network card, is used. The installation of new software to such system may also pose problems to the old remote network booting configuration. This invention therefore introduces a method of 'Plug and Play' for system booting in the easiest manner. One has just to set up the operating system image once on an industry-standard hard disk and that image can then be re-used time and again. So even for an organization with 1,000 different computers, its maintenance tasks may boil down to storing the system images of these computers to about 10 hard disks. An office of 100 computers can just keep 1 hard disk for booting. Application usage in office can also be standardized. Tasks for installation and delivery of applications can be minimized. Hard disk(s) can be saved for each machine. For standalone mobile notebook computers, the running of the computer disklessly through using a ramdisk-based operating system represents energy saving. One can run a ramdisk-based operating system, for instance Windows 98, while surfing the internet and use another hard-disk-based operating system, for example Linux or Windows XP, for doing work when not connected to internet. Two different operating systems with different hard disk partition formats running in different modes at different times may help keep virus infection to a minimum. This invention reveals a method that can make swapping of the relatively cheap and fast industry-standard hard disk(s) very easy. New computers may have a new design with this method of usage in mind. The computer can only show up a data port for the IDE/ATA interface for those previously industry-standard 'Fixed' hard disk(s), which now become separately or externally powered mobile hard disk(s). The mobile notebook or desktop computer may have a secondary switchable internal power supply or battery for separately powering these mobile hard disk(s). The design of casing for these mobile hard disk(s) may change for providing for new power source and the mobile hard disk(s) may also switch amongst connecting to IDE/ATA interface, connecting to USB interface, and connecting to Firewire interface with new interface card design. The prior art for the implementation of this invention includes APM, ACPI or other similar technologies and their specifications; computers and its associated hardware supporting such technologies, particularly industry-standard hard disks; operating systems capable of being run as ramdisk-based operating system;

methods of taking operating systems to run as ramdisk-based operating system; standard commands commonly used in operating systems for manipulating the logical disconnection and re-connection of industry-standard hard disks or other similar programs/applications/utilities giving instructions to the same effects; and standard commands commonly used in operating systems for putting the computer into various power management states, including 'Standby' and 'Suspend to RAM' states or other similar programs/applications/utilities giving instructions to the same effects. In combination with the use of the technical features contained in the prior art stated above, this invention makes possible 'Cool-Swap', 'Warm-Swap' and 'Hot-Swap' of 'Fixed' 'System' hard disk (s) in and out of the computer as well as re-cycling the computer between 'diskly' state to 'diskless' state by combining the following features in one way or the other: separating the power supply of the 'Fixed' 'System' hard disk(s) from the internal power supply that is supplying power to other components of the computer, in particular the motherboard; taking the operating system, capable of being taken to run as ramdisk-based operating system, in control of the computer to run as ramdisk-based operating system; putting the computer into different power management states; and issuing commands or instructions for logical disconnection and/or re-connection of hard disk(s); and, in this relation, is characterized by the following claims.

Sequence List Text

The invention claimed is:

1. A method for hot-swapping a fixed system hard disk installed with an operating system which is able to be run as a ram-disk-based operating system in a computer having a motherboard with a data bus which has the same interface type as a fixed mass storage device and an internal power supply which supplies power to said motherboard when said computer is operating, comprising the steps of:
  (a) connecting said fixed hard disk to said data bus of said motherboard through said interface;
  (b) connecting said fixed hard disk with a separate power supply which is different from said internal power supply and doesn't supply power to said motherboard and other components of said computer;
  (c) starting to run said computer with said fixed system hard disk;
  (d) bootstrapping the image of said operating system to run as a ram-disk-based operating system;
  (e) removing need for access as well as access to said fixed system hard disk from said computer and said operating system by the following steps:
    (e.0) placing all files needed to be accessed from said fixed system hard disk into RAM;
    (e.1) flushing software disk caches for said fixed system hard disk;
    (e.2) flushing hardware disk caches for said fixed system hard disk;
    (e.3) stopping said fixed system hard disk; and
    (e.4) logically removing said fixed system hard disk from said operating system;
  (f) leaving said computer in a normal running state;
  (g) disconnecting said fixed system hard disk from said data bus and said separate power supply; and
  (h) physically connecting another fixed hard disk or said fixed system hard disk with said data bus and said separate power supply.

2. The method, as recited in claim 1, further comprising a step (i) of logically connecting said other fixed hard disk or said fixed system hard disk with said operating system so as to allow said operating system to become aware of the existence of said fixed hard disk or said fixed system hard disk.

3. A method for warm-swapping a fixed system hard disk installed with an operating system which is able to be run as a ram-disk-based operating system in a computer having a motherboard with a data bus which has the same interface type as a fixed mass storage device and an internal power supply which supplies power to said motherboard when said computer is operating, comprising the steps of:
  (a) connecting said fixed hard disk to said data bus of said motherboard through said interface;
  (b) connecting said fixed hard disk with a separate power supply which is different from said internal power supply and doesn't supply power to said motherboard and other components of said computer;
  (c) starting to run said computer with said fixed system hard disk;
  (d) bootstrapping the image of said operating system to run as a ram-disk-based operating system;
  (e) removing need for access as well as access to said fixed system hard disk from said computer and said operating system by the following steps:
    (e.0) placing all files needed to be accessed from said fixed system hard disk into RAM;
    (e.1) flushing software disk caches for said fixed system hard disk;
    (e.2) flushing hardware disk caches for said fixed system hard disk;
    (e.3) stopping said fixed system hard disk; and
    (e.4) logically removing said fixed system hard disk from said operating system;
  (f) putting said computer into a standby state that the target fixed system hard disk is to be disconnected, where the standby state corresponds to the APM Standby state as defined in the Advanced Power Management BIOS Interface Specification Revision 1.2 or to the S1 or S2 Sleeping state as defined in the Advanced Configuration and Power Interface Specifications Revision 2.0c;
  (g) disconnecting said fixed system hard disk from said data bus and said separate power supply; and
  (h) physically connecting another fixed hard disk or said fixed system hard disk with said data bus and said separate power supply.

4. The method, as recited in claim 3, further comprising a step (i) of waking up and putting said computer in a normal running state.

5. The method, as recited in claim 4, further comprising a step (j) of logically connecting said other fixed hard disk or said fixed system hard disk with said operating system so as to allow said operating system to become aware of the existence of said fixed hard disk or said fixed system hard disk.

6. A method for cool-swapping a fixed system hard disk installed with an operating system which is able to be run as a ram-disk-based operating system in a computer having a motherboard with a data bus which has the same interface type as a fixed mass storage device and an internal power supply which supplies power to said motherboard when said computer is operating, comprising the steps of:
  (a) connecting said fixed hard disk to said data bus of said motherboard through said interface;
  (b) connecting said fixed hard disk with a separate power supply which is different from said internal power supply and doesn't supply power to said motherboard and other components of said computer;
  (c) starting to run said computer with said fixed system hard disk;

(d) bootstrapping the image of said operating system to run as a ram-disk-based operating system;
(e) removing need for access as well as access to said fixed system hard disk from said computer and said operating system by the following steps:
  (e.0) placing all files needed to be accessed from said fixed system hard disk into RAM,
  (e.1) flushing software disk caches for said fixed system hard disk;
  (e.2) flushing hardware disk caches for said fixed system hard disk;
  (e.3) stopping said fixed system hard disk; and
  (e.4) logically removing said fixed system hard disk from said operating system;
(f) putting said computer into a suspend-to-RAM state that the target fixed system hard disk is to be disconnected, where the suspend-to-RAM state corresponds to the APM Suspend state as defined in the Advanced Power Management BIOS Interface Specification Revision 1.2 or to the S3 Sleeping state as defined in the Advanced Configuration and Power Interface Specifications Revision 2.0c.;
(g) disconnecting said fixed system hard disk from said data bus and said separate power supply; and
(h) physically connecting another fixed hard disk or said fixed system hard disk with said data bus and said separate power supply.

7. The method, as recited in claim 6, further comprising a step (i) of waking up and putting said computer in a normal running state.

8. The method, as recited in claim 7, further comprising a step (j) of logically connecting said other fixed hard disk or said fixed system hard disk with said operating system so as to allow said operating system to become aware of the existence of said fixed hard disk or said fixed system hard disk.

* * * * *